United States Patent [19]

Suzuki

[11] Patent Number: 5,442,490

[45] Date of Patent: Aug. 15, 1995

[54] OBJECTIVE LENS DRIVING APPARATUS

[75] Inventor: Hiroyuki Suzuki, Higashihiroshima, Japan

[73] Assignee: Sharp Kabushiki Kaisha, Osaka, Japan

[21] Appl. No.: 3,495

[22] Filed: Jan. 12, 1993

[30] Foreign Application Priority Data

Jan. 27, 1992 [JP] Japan ................... 4-011587

[51] Int. Cl.⁶ ..................... G02B 7/02; G11B 7/09
[52] U.S. Cl. ................... 359/824; 359/814; 369/44.15
[58] Field of Search ............... 359/813, 814, 823, 824; 369/44.11–44.19, 44.21–44.22

[56] References Cited

U.S. PATENT DOCUMENTS

| | | | |
|---|---|---|---|
| 4,479,051 | 10/1984 | Musha | 369/44.16 |
| 4,664,476 | 5/1987 | Kasuga | 359/814 |
| 4,752,117 | 6/1988 | Ichikawa et al. | 359/824 |
| 4,759,005 | 7/1988 | Kasahara | 359/814 |
| 4,988,165 | 1/1991 | Ishii et al. | 359/814 |
| 5,103,438 | 4/1992 | Masunaga et al. | 369/44.22 |
| 5,111,339 | 5/1992 | Hagiwara | 359/813 |
| 5,130,854 | 7/1992 | Suzuki | 359/824 |
| 5,184,002 | 2/1993 | Chu | 369/44.15 |

FOREIGN PATENT DOCUMENTS

| | | |
|---|---|---|
| 0233380 | 8/1987 | European Pat. Off. . |
| 0348845 | 1/1990 | European Pat. Off. . |
| 0371799 | 6/1990 | European Pat. Off. . |
| 419097 | 3/1991 | European Pat. Off. ......... 369/44.15 |
| 0440196A2 | 8/1991 | European Pat. Off. . |
| 60-191441 | 9/1985 | Japan . |
| 64-8518 | 1/1989 | Japan . |
| 64-14736 | 1/1989 | Japan . |

OTHER PUBLICATIONS

Patent Abstracts of Japan, vol. 10, No. 48 (P-431), Sep. 28, 1985.

Primary Examiner—Ricky D. Shafer
Assistant Examiner—Thong Nguyen
Attorney, Agent, or Firm—Nixon & Vanderhye

[57] ABSTRACT

An objective lens holder is movably attached at a fixing portion of a base by means of a support body for driving the objective lens. A pair of arched permanent magnets are fixed along an arched outer circumference of the objective lens holder. Focusing coils and tracking coils are fixed on the base to oppose, with a small gap, the permanent magnets. The objective lens holder can slide in the focusing direction along an axial line parallel to the optical axis of the objective lens, and it is also rotatable in the tracking direction about the axial line. Since the gap between the permanent magnets and each of the coils is minimized, the electromagnetic force generated in each coil can be fully utilized, and sensitivity of the control signal applied to each coil is improved. Further, the size of the optical pickup apparatus in which the objective lens driving apparatus is incorporated is reduced.

15 Claims, 3 Drawing Sheets

OBJECTIVE LENS DRIVING APPARATUS

BACKGROUND OF THE INVENTION

1. Field of the Invention

The present invention relates to an objective lens driving apparatus for adjusting position of beam irradiation by moving the objective lens in an optical pickup apparatus used in an optical information recording and reproducing apparatus and the like.

2. Description of the Background Art

An optical pickup apparatus is structured such that a light beam is converged on a recording surface of an optical disk through an objective lens. The objective lens is mounted on an objective lens driving apparatus. The position of the objective lens is controlled by the objective lens driving apparatus in accordance with the detected amount of change of the light reflected from the optical disk so that the convergent light of the beam sequentially traces accurately the prescribed track on the recording surface of the optical disk. By the objective lens driving apparatus, the objective lens is driven in two directions, that is, the optical direction of the objective lens or a focusing direction perpendicular to the recording surface of the optical disk, and a direction orthogonal to the optical axis, for example, the tracking direction parallel to the recording surface of the optical disk.

In a conventional axially sliding type objective lens driving apparatus, an axis is fixed vertical to the base. This axis is the central axis for rotation as well as the central axis for sliding. A guide cylinder of the objective lens is fitted to the axis. The objective lens is attached to the objective lens holder. The objective lens holder is movably attached on the base with an elastic member interposed. Thus, the objective lens holder can rotate and slide in the transformable range of the elastic member. A focusing coil is wound around the outer periphery of the objective lens holder. In addition, a tracking coil is provided on the focusing coil. A pair of permanent magnets are provided near the outer peripheral portion of the objective lens holder so as to oppose to each of the coils. The permanent magnets are attached to an inner yoke portion and an outer yoke portion. The inner yoke portion and the outer yoke portion are fixed at the base.

In a different type objective lens driving apparatus, the objective lens holder is supported on the base by supporting means having a link mechanism. The support means includes a metal spring or a resin molded body. A pair of permanent magnets are fixed on the base. A focusing coil is mounted on the objective lens holder opposing to the permanent magnets. The focusing coil is provided to surround the inner yoke portion. A tracking coil is provided over the focusing coil.

In the above described objective lens driving apparatus, the narrower the gap between the permanent magnet and the inner yoke portion becomes, the stronger the magnetic field generated in the gap becomes. Therefore, even if the control signal current flowing through the focusing coil and through the tracking coil is relatively small, a prescribed power can be obtained.

However, since the tracking coil is provided overlapped on the focusing coil, there is a limit in narrowing the gap mentioned above. Further, since the electromagnetic force of each coil influences with each other to decrease sensitivity in driving in the respective directions, the problem of crosstalk occurs.

In order to solve the above described problem, an objective lens driving apparatus is proposed in Japanese Patent Laying-Open No. 64-8518. A radial anisotropic magnet is provided in the objective lens driving apparatus. The radial anisotropic magnet has a magnetizing vector in a direction perpendicular to the cylindrical surfaces of the objective lens holder. An inner yoke portion and an outer yoke portion are formed to sandwich the cylindrical surface of the objective lens holder. A focusing coil and a tracking coil are mounted on cylindrical surfaces opposing to the outer yoke portion and the magnet. Thus a magnetic circuit is formed.

In order to solve the above-described problem, another objective lens driving apparatus is proposed in Japanese Patent Laying-Open No. 64-14736. In this objective lens driving apparatus, the focusing coil and the tracking coil are formed not to overlap with each other in the radial direction of the objective lens holder. Thus the magnetic circuit is formed such that the magnetic field traversing each coil is formed opposite to each other.

In the meantime, down sizing, reduction in weight, low power consumption and low manufacturing cost of product such as optical disk apparatus and so on containing the optical pickup apparatus have been desired. Therefore, down sizing, reduction in weight and lower manufacturing cost are also desired for the objective lens driving apparatus incorporated in the optical pickup apparatus.

However, in order to further reduce the size of the conventional objective lens driving apparatus, the area on which the plurality of focusing coils and tracking coils attached on the objective lens holder are to be soldered must be reduced. This causes decreased efficiency in the manufacturing steps of the objective lens driving apparatus. If the objective lens driving apparatus having the conventional structure is further reduced in size, it leads to increase manufacturing cost and it may cause degradation in quality because of, for example, defective soldering. As a method for solving these problems, permanent magnet may be provided on the side of the objective lens holder in the objective lens driving apparatus. This makes it unnecessary to attach the coils on the objective lens holder. Therefore, power supply to the movable objective lens holder becomes unnecessary, and soldering in a small space also becomes unnecessary. However, since the permanent magnet is provided on the movable objective lens holder it becomes difficult to form a magnetic circuit including the yoke portion.

Accordingly, one objective lens driving apparatus is disclosed in Japanese Patent Laying-Open No. 60-191441. In this objective lens driving apparatus, the permanent magnet is provided on a movable body holding the objective lens. A coil for adjusting focusing position and the tracking position is provided on the support body opposing to the permanent magnet. In this objective lens driving apparatus, the movable body can move in the tracking direction and in the focusing direction without any yoke portion. However, in this objective lens driving apparatus, the driving power of the objective lens holder (movable body) is decreased because of the influence of the weight of the permanent magnet. This results in degraded following characteristic of the objective lens by a servo circuit, which characteristic is important in the performance of the optical pickup apparatus. Further, in some products such as optical disk apparatuses using batteries as power supply, power consumption is increased.

Therefore, the technical problem to be solved is how to make smaller the gap between the permanent magnet and each coil and to reduce as much as possible, the number of parts which increases the weight of the balancer and the like for the objective lens.

SUMMARY OF THE INVENTION

An object of the present invention is to make as narrow as possible the gap between the permanent magnet and the focussing coil or the tracking coil in an objective lens driving apparatus.

Another object of the present invention is to make full use of electromagnetic power generated in each coil in the objective lens driving apparatus and to improve sensitivity to control signals applied to each coil in driving the objective lens.

A further object of the present invention is to reduce weight of movable portions holding the objective lens in the objective lens driving apparatus.

A still further object of the present invention is to provide an objective lens driving apparatus which contributes to down sizing of the optical pickup apparatus.

The objective lens driving apparatus in accordance with one aspect of the present invention is an apparatus for moving an objective lens in the optical axis direction of the objective lens and on a plane perpendicular to the optical axis, including a movable member, a base member, first and second permanent magnet members, first and second focus adjusting coils and first and second tracking adjusting coils. The movable member holds the objective lens having a prescribed optical axis. The base member supports the movable member such that the movable member can slide along an axial line, which is positioned outside the objective lens and parallel to the optical axis, and that the movable member can turn in the circumferential direction with the axial line being the center. The first and second permanent magnet members are fixed on the movable member at positions opposing each other with the axial line being the center, such that each magnet member has a shape including an inner peripheral surface and an outer peripheral surface along circular portions of the movable member with the axial line being the center and magnetic poles consisting of the inner peripheral surface and the outer peripheral surface. The first and second focus adjusting coils are provided at the base member opposite the outer peripheral surfaces of the first and second permanent magnet members and have coil axes (a coil axis being the axis around which the coils are wrapped) which are approximately parallel to the axial line. First and second tracking adjusting coils are provided at the base member opposite the outer peripheral surfaces of the first and second permanent magnet members and have coil axes tangent to the circular portions of the movable member at positions opposing the outer peripheral surfaces of the first and second permanent magnet members.

According to a preferred embodiment of the objective lens driving apparatus in accordance with one aspect of the present invention, the movable member includes an outer surface which is aligned with the outer peripheral surface of the first and second permanent magnet members. The objective lens is arranged at one end of the movable member with the axial line being the center, and a body having a prescribed weight is arranged at the other end of the objective member which is opposite to the movable lens, with the axial line being the center of the movable member. Preferably, the objective lens driving apparatus further includes a movable support member formed of a flexible material, connecting the movable member with the base member. The movable support member has a hinge portion. The axial line, which is parallel to the optical axis of the objective lens, and positioned outside the objective lens passes through the hinge portion.

The objective lens driving apparatus in accordance with another embodiment of the present invention is an apparatus for moving the objective lens at least in a plane perpendicular to an optical axis of the objective lens (i.e. a line perpendicular to and running through the center of the objective lens), and it includes a movable member, a base member, a permanent magnet member and a driving coil. The movable member holds the objective lens. The base member supports the movable member such that the movable member can rotate about an axial line which is parallel to the optical axis and positioned outside the objective lens. The permanent magnet member is fixed on the movable member. The driving coil is provided on the base member at a position opposing the permanent magnet member. The permanent magnet member is arranged on the side of the movable member which is spaced from the objective lens arranged on an opposite side of the movable member such that the axial line passes through a center of gravity of the movable member between the two sides.

The objective lens driving apparatus in accordance with a further aspect of the present invention is an apparatus for moving the objective lens, along the optical axis of the objective lens and on a plane perpendicular to the optical axis, and it includes a movable member, a base member, movable support means, first and second permanent magnet members and a plurality of driving coils. The movable member holds the objective lens. The base member supports the movable member. The movable support means connects the movable member to the base member. The movable support means includes first and second support elements. The first support element enables movement of the movable member, along the optical axis using a parallel link structure. The second support element is provided at a movable end of the first support element and allows rotation of the movable member about an axial line parallel to the optical axis. The fixed end of the first support element is fixed on the base member. The movable member is attached at one end via the second support to the base member, and the objective lens is attached at the other end. The first and second permanent magnet members are opposedly fixed on the movable member at positions on the one end of the movable member. The plurality of driving coils are provided on the base member at positions opposing the first and second permanent magnet members, respectively.

In the objective lens driving apparatus in accordance with one aspect of the present invention, the first and second permanent magnet members are fixed on the movable member at positions opposing each other and included by a rotation axial line of the movable member. The first and second permanent magnet members have outer circumferential surfaces along circular portions of the movable member with the rotation axial line being the center. The first and second focus adjusting coils and the first and second tracking adjusting coils are provided on the base member opposite to the outer peripheral surfaces of the first and second permanent magnet members. Therefore, the gap between the permanent magnet member and the focus adjusting coil or the tracking adjusting coil can be minimized. This improves sensitivity to the control signals applied to each coil. The first and second permanent magnet members have outer shapes including inner circumferential surfaces and outer circumferential surfaces along the circular portions of the movable member and they have magnetic poles formed of the inner circumferential surfaces and the outer circumferential surfaces. Since the first and second permanent magnet members are formed in this manner, the size of the permanent magnet members is minimized. This further reduces the weight of the movable member and making the objective lens driving apparatus small in size, low in power consumption and high in driving sensitivity.

In the objective lens driving apparatus in accordance with a different aspect of the present invention, the permanent magnet member is arranged on one end of the movable member opposite to the end of the movable member where the objective lens is mounted with the rotation axial line of the movable member being the center of the movable member. Thus, the weight balance of the movable member is maintained such that the rotation axial line passes through the center of gravity of the movable member. In this manner, in the objective lens driving apparatus of the present invention, the permanent magnet member also serves as the weight balancer of the movable member. Therefore, the weight of the objective lens driving apparatus can be further reduced, and also the size thereof can be made smaller.

By making the gap between the permanent magnet and each coil as narrow as possible, the electromagnetic power generated in each coil can be fully utilized, and in driving the objective lens moving the permanent magnet side, sensitivity by the control signal applied to each coil can be improved. Since the permanent magnet member can be also be used as a weight balancer of the movable member, total weight of the movable member can be reduced. Therefore, the sensitivity of the control signal applied to each coil in driving the objective lens can be further improved. By employing the objective lens driving apparatus of the present invention, the optical pickup apparatus can be further reduced in size.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
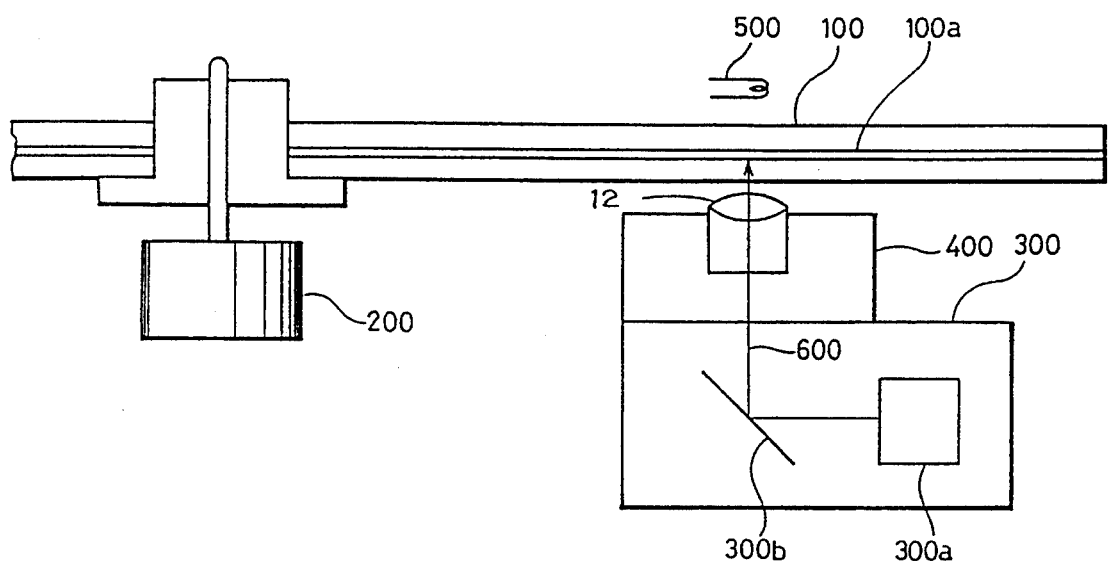
FIG. 1 is a schematic side view showing an example of the optical disk apparatus incorporating the objective lens driving apparatus of the present invention.

An example of the optical disk apparatus incorporating the objective lens driving apparatus of the present invention will be described with reference to FIG. 1. Referring to FIG. 1, the optical disk apparatus as an optical information recording and reproducing apparatus includes a motor 200 and an optical pickup apparatus. A disk 100 is rotary driven by the motor 200. The optical pickup apparatus includes a housing 300 and an objective lens driving apparatus 400. Housing 300 includes a laser light source 300a and a deflecting mirror 300b. The objective lens 12 is positioned at an optical path between deflecting mirror 300b and optical disk 100 and held by objective lens driving apparatus 400. A laser beam 600 emitted from laser light source 300a is reflected by deflecting mirror 300b. Thereafter, laser beam 600 passes through objective lens 12 and converges on a surface of a disk recording medium 100a contained in optical disk 100. Thus, by optical spots formed disk on recording medium 100a, recording, reproduction or erasure of information is carried out optically. The optical pickup apparatus irradiates the optical disk 100 with laser beam 600 and takes light reflected from optical disk 100. The optical pickup device is moved by a feeding mechanism in the radial direction of optical disk 100. The feeding mechanism includes driving means such as a linear motor. The objective lens driving apparatus 400 of the present invention moves objective lens 12 upward, downward in the left and in the right to control the position of convergence of laser beam 600 (position of formation of the light spot) such that it follows the recording track on disk recording medium 100a. An electromagnetic coil 500 generates a magnetic field for recording or erasing information on disk recording medium 100a.

In the above described optical disk apparatus, when optical disk 100 is to be operated, the information track portion on optical disk 100 moves upward and downward (namely, in the direction of the optical axis) because of surface fluctuation as the disk rotates. Further, the information track portion on optical disk 100 moves in the left and right directions (namely, radial direction of the disk) because of the eccentricity between the rotation axis of the disk and the axis of motor 200 rotating the disk. Therefore, objective lens 12 is moved by objective lens driving apparatus 400 in the direction of the optical axis (focusing direction) with respect to the surface of disk recording medium 100a of optical disk 100. Further, objective lens 12 is moved by the objective lens driving apparatus 400 in the radial direction (tracking direction) of optical disk 100. Consequently, objective lens 12 is moved corresponding to fluctuation of the surface of disk recording medium 100a and to eccentric rotation of the disk. In this manner, laser beam 600 can be converged accurately on the information track portion constantly.

Figure 2:
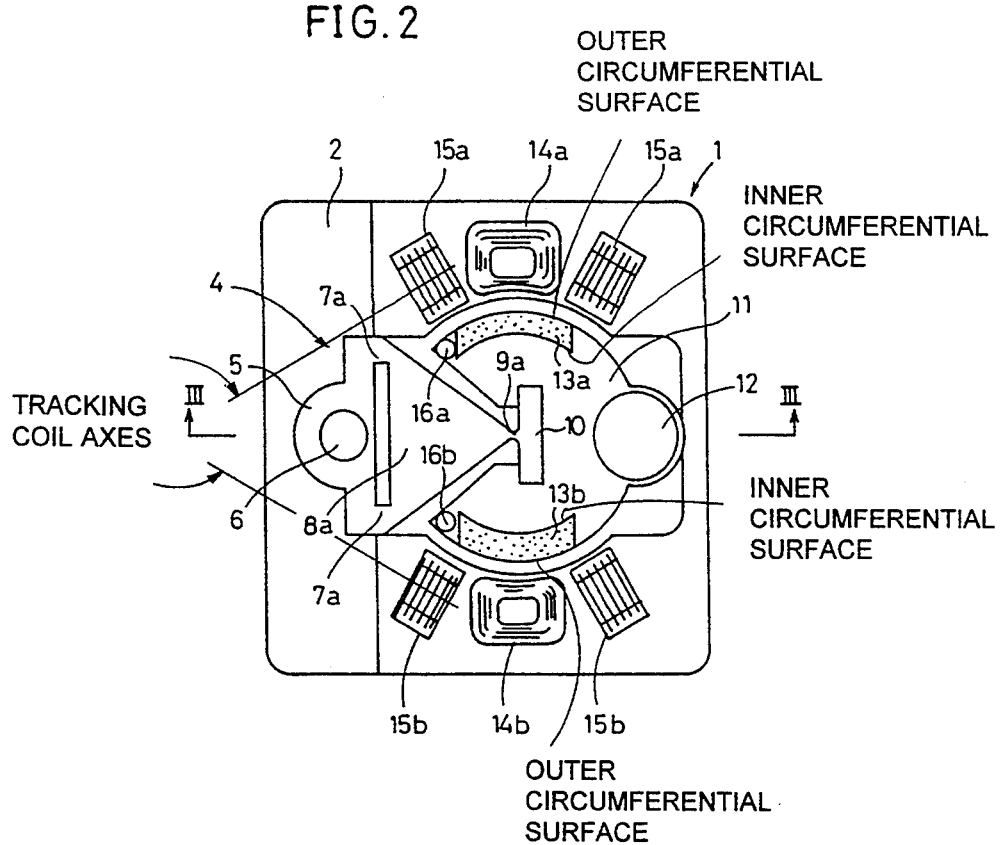
FIG. 2 is a plan view showing a first embodiment of the objective lens driving apparatus of the present invention.
Figure 3:
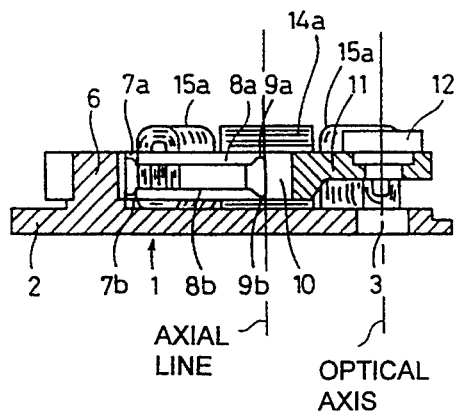
FIG. 3 is a partial cross sectional view showing a cross section taken along the line III—III of FIG. 2.
Figure 4:
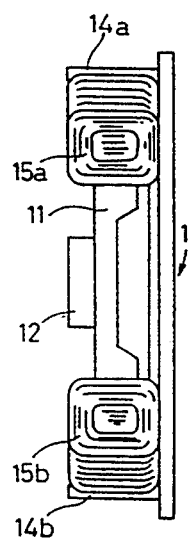
FIG. 4 is a side view of the objective lens driving apparatus shown in FIG. 2.

One embodiment of the objective lens driving apparatus of the present invention will be described with reference to FIGS. 2 to 4. A base 1 constitutes a portion of a housing of the objective lens driving apparatus. Base 1 is a rectangular flat plate having a fixing portion 2. A through hole 3 is provided at base 1. The laser beam passes through objective lens 12 and through hole 3. A support body for driving the objective lens (hereinafter referred to as a support body) 4 is adhered and fixed at the fixing portion 2 of base 1. Support body 4 is fixed on base 1 by a pin 6 pushed in a fixing portion 5 of support body 4, for example. Support body 4 includes hinge portions 7a, 7a, and 7b, 7b hinge portions 9a, 9b, and an objective lens holder attaching portion (hereinafter referred to as a holder attaching portion) 10. Hinge portions 7a, 7a, and 7b, 7b are locally made thin so that they can swing in the focusing direction, and these portions are flexible. The hinge portions 9a and 9b are locally made thin so that they can swing in two directions, that is, the focusing direction and the tracking direction by means of flat and triangular link portions 8a and 8b, and they are flexible. The hinge portions 7a, 7b, the link portions 8a, 8b and the hinge portions 9a and 9b have parallel link mechanism. By the parallel link mechanism, the support body 4 can move in the focusing direction, that is, the direction of the optical axis of objective lens 12. By hinge portions 9a and 9b, support body 4 can move in the tracking direction, that is, on a plane perpendicular to the direction of the optical axis. Support body 4 having these portions is integrally molded by synthetic resin.

Objective lens holder 11 is fitted and fixed at holder attaching portion 10. Outer circumferential shape of objective lens holder 11 is an arc as shown in FIG. 2, with a line connecting centers of hinge portions 9a and 9b being the center. In objective lens holder 11, objective lens 12 is adhered and fixed at a tip end on a line coupling pin 6 with hinge portion 9a. Objective lens 12 can move in the focusing direction which is parallel to the optical axis of objective lens 12 by the parallel link mechanism of support body 4. Objective lens 12 can move in the tracking direction on the plane perpendicular to the optical axis of objective lens 12 by hinge portions 9a and 9b of support body 4.

A pair of arched permanent magnets 13a and 13b are fixed on objective lens holder 11 to be matched with the arced circumference of objective lens holder 11 with the hinge portion 9a being the center. Permanent magnets 13a and 13b have magnetic poles formed by the arched inner circumferential surfaces and the outer circumferential surfaces. The height of the permanent magnets 13a and 13b is approximately equal to the height of support body 4. Focusing coils 14a and 14b are adhered and fixed on the base 1 to oppose, with a small gap, to the outer sides of the permanent magnets 13a and 13b. Focusing coils 14a and 14b do not have the yoke portion. The coil axis of each of the focusing coils 14a and 14b is parallel to the optical axis of objective lens 12. Tracking coils 15a, 15a and 15b, 15b are adhered and fixed on base 1 to be opposed, with a small gap, to outer sides of the permanent magnets 13a and 13b. Tracking coils 15a and 15b do not have a yoke portion. Tracking coils 15a and 15b are arranged on both sides of focusing coils 14a and 14b, respectively. Coil axes of the tracking coils 15a and 15b is parallel to the tangent of the arc forming the outer circumferential surface of the permanent magnets 13a and 13b. Although the permanent magnets 13a and 13b mentioned above constitute a pair respectively, a pair may be constituted by a plurality of small pieces of permanent magnets so that they oppose to the focusing coils 14a, 14b and to the tracking coils 15a, 15a and 15b, 15b, respectively.

At symmetrical positions with the hinge portions 9a and 9b being the center and on opposite side of objective lens 12, weights 16a and 16b are fixed on objective lens holder 11. Weights 16a and 16b are provided for keeping the weight balance with respect to objective lens 12 and the pair of permanent magnets 13a and 13b in objective lens holder 11.

Permanent magnets 13a and 13b on objective lens holder 11 move in the focusing direction, that is, the direction parallel to the optical axis of the objective lens 12 by the electromagnetic force generated by the current flowing through the focusing coils 14a and 14b. The direction of winding of the focusing coils 14a and 14b is determined on the basis of Fleming's left hand rule so that such electromagnetic force is generated. The permanent magnets 13a and 13b rotate in the tracking direction with the hinge portions 9a and 9b being the center by the electromagnetic force caused by the current flowing through the tracking coils 15a and 15b. The direction of winding the tracking coils 15 and 15b is determined on the basis of Fleming's left hand rule so that such electromagnetic force is generated.

Figure 5:
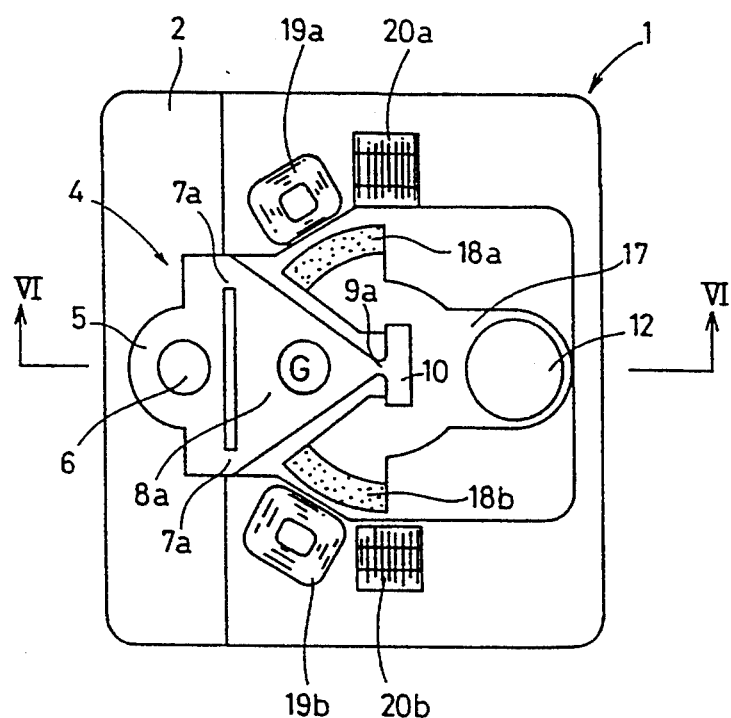
FIG. 5 is a plan view showing a second embodiment of the objective lens driving apparatus of the present invention.
Figure 7:
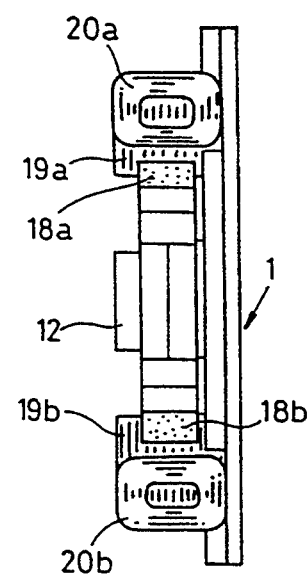
FIG. 7 is a side view of the objective lens driving apparatus shown in FIG. 5.
Figure 6:
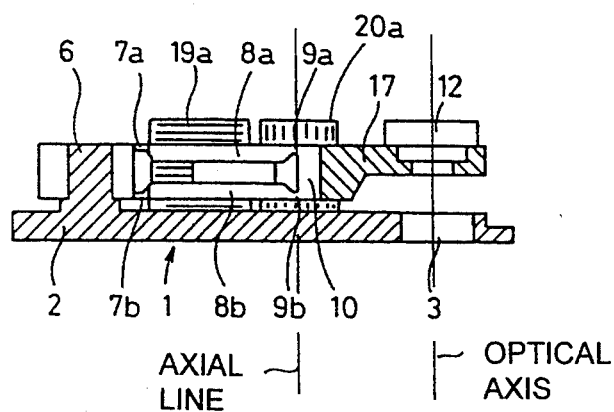
FIG. 6 is a partial cross sectional view showing a cross section taken along the line VI—VI of FIG. 5.

A second embodiment of the objective lens driving apparatus of the present invention will be described with reference to FIGS. 5 to 7. Portions which are the same as those in the first embodiment described with reference to FIGS. 2 to 4 are denoted by the same reference characters in FIGS. 5 to 7. Similar to the first embodiment described above, support body 4 for driving the objective lens is adhered and fixed at fixing portion 2 of base 1. Fixation of support body 4 is carried out by pushing a pin 6 at fixing portion 5. An objective lens holder 17 is fitted and fixed at holder attaching portion 10 of support body 4. At least a portion of the outer circumferential shape of objective lens holder 17 is an arc with a point on a line coupling the centers of hinge portions 9a and 9b being the center.

A pair of permanent magnets 18a and 18b are symmetrically fixed at objective lens holder 17 on the side of the support body 4 which is opposite to the objective lens 12, at symmetrical positions with the hinge portion 9a of support body 4 being the center. The arc shape of permanent magnets 18a and 18b matches the arched circumference of objective lens holder 17. The permanent magnets 18a and 18b have magnetic poles formed by the arced inner and outer circumferential surfaces. Focusing coils 19a and 19b are adhered and fixed on base 1 to oppose, with a small gap, to the outer sides of the permanent magnets 18a and 18b. The coil axes of the focusing coils 19a and 19b are parallel to the optical axis of objective lens 12. Tracking coils 20a and 20b are adhered and fixed on base 1 to oppose, with a small gap, to the outer sides of the permanent magnets 18a and 18b. Tracking coils 20a and 20b are arranged at side portions of focusing coils 19a and 19b on the side of the objective lens 12. Coil axes of the tracking coils 20a and 20b are parallel to the tangent of the arc forming the outer circumferential surface of permanent magnets 18a and 18b. In objective lens holder 17, the arrangement of permanent magnets 18a, 18b, for example, is determined such that weight balance of objective lens 12 and the pair of permanent magnets 18a and 18b is well balanced with the hinge portions 9a and 9b being the center. More specifically, arrangement of permanent magnets 18a and 18b is determined such that the center of gravity of objective lens holder 17 exists on a line coupling the centers of hinge portions 9a and 9b.

In the above described first and second embodiments, the gap between the permanent magnet and the focusing coil and between the permanent magnet and the tracking coil can be made narrow in the ideal form. In the second embodiment, the permanent magnets 18a and 18b can also serve as the weight disclosed in the first embodiment.

Although support body for driving the objective lens having parallel link mechanism utilizing hinge portions formed of synthetic resin is employed as the movable support means in the above-described first and second embodiments, a parallel plate spring, resilient wire material and the like may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An objective lens driving apparatus for moving an objective lens along an optical axis of the objective lens and along a plane perpendicular to the optical axis, comprising:
   a generally disk-shaped, movable member for holding the objective lens;
   a base member for supporting said movable member such that said movable member is movable along an axial line that is parallel to said optical axis and that intersects a center portion of the movable member, said movable member being rotatable about said axial line;
   first and second permanent magnet members opposedly fixed on said movable member with each magnet member having curved inner and outer surfaces concentric with respect to said axial line;
   first and second focus adjusting coils provided on said base member opposite and separated by a gap from the outer surfaces of said first and second permanent magnet members, respectively, with coil axes of the focusing coils being approximately parallel to said axial line; and
   first and second tracking adjusting coils provided on said base member opposite and separated by a gap from the outer surfaces of said first and second permanent magnet members, respectively, with coil axes of the tracking adjusting coils being approximately perpendicular to said axial line.

2. The objective lens driving apparatus according to claim 1, wherein outer circumferential surfaces of said first and second permanent magnet members are concentric to a peripheral edge of the disk-shaped movable member.

3. The objective lens driving apparatus according to claim 1, wherein said objective lens is arranged at one end of said movable member and a predetermined weight is arranged at another end of said movable member to balance said objective lens about the center portion of said movable member.

4. The objective lens driving apparatus according to claim 3, wherein plural predetermined weights are positioned at the another end of said movable member such that an effective weight located at a center of gravity between the plural weights balances said objective lens about the center portion of said movable member.

5. The objective lens driving apparatus according to claim 1, further comprising a movable support member formed of a flexible material for flexibly connecting said movable member to said base member.

6. The objective lens driving apparatus according to claim 5, wherein said movable support member includes a first hinge permitting rotation of said movable member.

7. The objective lens driving apparatus according to claim 6, wherein said axial line passes through said first hinge.

8. The objective lens driving apparatus according to claim 5, wherein said movable support member includes a second hinge positioned proximate said base member permitting movement of said objective lens along said optical axis.

9. An objective lens driving apparatus, comprising:
   a movable member for holding an objective lens having an optical axis;
   a base member for movably supporting said movable member to permit rotation of said movable member about an axial line parallel to said optical axis and intersecting approximately a center portion of the movable member;
   a pair of permanent magnet members fixed on opposing outer edges of said movable member, wherein a center of gravity between the pair of magnets is opposite the objective lens, the axial line interposed between the center of gravity and the objective lens; and
   plural tracking coils with a tracking coil provided on said base member at a position adjacent to each one of said pair of permanent magnet members, with a coil axis of each tracking coil being approximately perpendicular to the axial line.

10. An objective lens driving apparatus according to claim 9, further comprising:
    a focusing coil mounted on said base member adjacent to the tracking coil, with a coil axis of the focusing coil being parallel to the axial line.

11. An objective lens driving apparatus according to claim 9, wherein the center of gravity between the pair of permanent magnets balances the objective lens with said axial line being a point of balance.

12. An apparatus comprising:
    a base;
    a support member movably connected to the base at a reference position;
    an objective lens having an optical axis mounted on the support member about 180° from the reference position;
    a first permanent magnet mounted peripherally on the support member about 90° from the reference position;
    a second permanent magnet mounted peripherally on the support member about 270° from the reference position;
    first and second focus coils mounted on the base opposite the first and second magnets, respectively, wherein selective application of current to the first and second focus coils moves the support member axially along the optical axis; and
    a first tracking coil mounted on the base adjacent to and spaced apart from the first focus coil along a circumference of the movable support member and opposite one end of the first permanent magnet and a second tracking coil mounted on the base adjacent to and spaced apart from the second focus coil along the circumference of the movable support member and opposite one end of the second permanent magnet, wherein selective application of current to the first and second tracking coils moves the support member in a plane perpendicular to the optical axis.

13. The apparatus according to claim 12, further comprising a movable support member formed of a flexible material for flexibly connecting the support member to the base.

14. The apparatus according to claim 13, wherein the movable support member includes a first hinge permitting rotation of the movable support member.

15. The apparatus according to claim 13, wherein the movable support member includes a second hinge positioned proximate the base permitting movement of the objective lens along the optical axis.

* * * * *